(12) United States Patent
Fledersbacher et al.

(10) Patent No.: US 6,467,454 B1
(45) Date of Patent: Oct. 22, 2002

(54) SPARK-IGNITION INTERNAL COMBUSTION ENGINE

(75) Inventors: Peter Fledersbacher; Siegfried Sumser, both of Stuttgart; Friedrich Wirbeleit, Esslingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/597,495

(22) Filed: Jun. 21, 2000

(30) Foreign Application Priority Data

Jul. 9, 1999 (DE) .......................... 199 32 119

(51) Int. Cl.⁷ .......................... F02B 31/00; F02M 35/10
(52) U.S. Cl. ...................... 123/301; 123/302; 123/306; 123/308
(58) Field of Search ............... 123/301, 302, 123/306, 308, 432; 60/598–604, 605.1

(56) References Cited

U.S. PATENT DOCUMENTS

| 4,233,814 A | * | 11/1980 | Thore .......................... 60/601 |
| 4,608,828 A | * | 9/1986 | Mikota ....................... 123/79 R |
| 4,669,434 A | * | 6/1987 | Okumura et al. ......... 123/188.14 |
| 4,703,734 A | * | 11/1987 | Aoyama et al. ............. 123/432 |
| 4,732,116 A | * | 3/1988 | Tanahashi et al. ...... 123/184.54 |
| 4,959,961 A | * | 10/1990 | Hiereth ....................... 123/432 |
| 5,123,246 A | * | 6/1992 | Younessi et al. ............... 60/602 |
| 5,239,960 A | * | 8/1993 | Sasaki et al. ................ 123/308 |
| 5,408,979 A | * | 4/1995 | Backlund et al. ............ 123/562 |
| 6,006,719 A | | 12/1999 | Matsumura |

FOREIGN PATENT DOCUMENTS

| EP | 0879941 A1 | 11/1998 |
| EP | 0879943 A2 | 11/1998 |
| JP | 6-248927 | 8/1985 |
| JP | 042122 A1 | * 2/1990 |
| JP | 246320 A1 | * 11/1991 |

* cited by examiner

Primary Examiner—Gene Mancene
Assistant Examiner—Arnold Castro
(74) Attorney, Agent, or Firm—Crowell & Moring LLP

(57) ABSTRACT

For a spark ignited internal combustion engine having at least two inlet valves per cylinder each with a separate inlet passage and with a fuel injection device which injects fuel directly into the cylinder. An air charger for generating an air charge into one of the inlet passages and a connecting duct extending between the two inlet passages with a selectively opened and closed regulating device therein to apportion the flow of charge air through the separate inlet passages.

8 Claims, 3 Drawing Sheets

SPARK-IGNITION INTERNAL COMBUSTION ENGINE

BACKGROUND OF THE INVENTION

1. Field of the Invention

This invention relates to a spark-ignition type internal combustion engine.

2. Description of Related Art

Internal combustion engine development is aimed at reducing exhaust-gas and noise emissions and lowering fuel consumption. Presently, the diesel type internal combustion engine has better fuel consumption than spark ignition engines. However, the spark-ignition type engine has advantages over the diesel engine, particularly with regard to particle and noise emission. It also has a higher specific power output potential.

Conventionally, the engine's combustion chamber is supplied with a homogeneous stoichiometric or rich fuel/air mixture so that the fuel/air mixture is ignited by the spark plug at the desired ignition point. Typically, during part-load operation the quantity of fuel and air are reduced by throttling. Throttling losses result in higher fuel consumption in a spark ignition engines than in a diesel engine. A diesel engine normally operates with a leaner fuel/air mixture than a spark ignition engine. It is desirable to provide a mixed operating mode in a spark ignition type engine to achieve both high torque characteristics and high power output. Thus, during a lower and medium speed range of engine operation a stratified-charge mode is desirable combined with a largely unthrottled air supply strategy. During a higher-load and higher speed range of engine operation, a homogeneous stoichiometric fuel/air mixture is desirable.

To produce a homogeneous stoichiometric fuel/air mixture desired for a higher-load and higher speed range of engine operation, fuel injected directly into the combustion chamber must be introduced at an early stage in the cycle, even as early as the latter portion of the intake suction portion of the engine cycle. Resultantly, the energy and volume of the air intake is utilised efficiently to create a high mean pressure and therefore a high torque characteristic. To produce a stratified-charge mode desired for a lower and medium speed range and part load mode of engine operation, fuel injected directly into the combustion chamber may be introduced into the combustion chamber relatively late during the compression portion of the engine cycle.

In normal operation or practice, vehicle engines are usually operated in a part-load and medium speed operational range. Therefore, a characteristic map or chart of engine operations should coincide with the characteristics associated with operation under a stratified-charge mode with its advantageous fuel consumption characteristics. However, there are good reasons to limit the operation in the stratified-charge mode of operation. For example, operation with a mean indicated pressure higher than about four bar can produce increasing emissions of soot particles. This occurs because there is insufficient time for complete evaporation under operation involving a large mass of fuel. Accordingly, the maximum useful operational range for stratified-charge characterised by a relatively late fuel injection is limited by speed and load variables. Furthermore, high exhaust-gas recirculation rates are necessary in order to lower the raw emissions of nitrogen oxides during engine operation in these relatively high speed and load ranges. High exhaust-gas recirculation rates leads, in turn, to increased hydrocarbon emissions and to a rise in fuel consumption.

In engines with direct injection of fuel, there are three combustion processes or methods available. A distinction is made between the three basic patterns which are: a jet-controlled method; a wall-controlled method; and an air-controlled method. Several factors are important with all three methods as follows: the properties of the fuel injector or jet; the geometry of the combustion chamber; and the air charge movement.

The jet-controlled method is characterised by a close spatial relationship between the fuel injector and the spark plug or plugs. The cloud of fuel injected into the combustion chamber forms a relatively compact area or zone, to which a quantity of air is introduced. Typically, the movement of the air is in a swirling pattern about an axis of the engine cylinder. The spatial arrangement of the fuel injector and the spark plug or plugs in the combustion chamber must be coordinated carefully to control the stratification profile.

With the wall-controlled method, the fuel/air mixture is formed and controlled by utilising adhesion of fluid to the walls of the combustion chamber and cylinder combined with subsequent separation.

The air-controlled method is based on the principle of transporting injected fuel to the spark plug by the movement of the air charge into the combustion chamber while at the same time actively mixing the air into the fuel cloud. The objective is to achieve a flattening of the stratification profile, so that formation of an extensive rich mixture zone is prevented.

In all three methods, essential factors for good part load and medium speed operation are: the charge movement; the air movement; the characteristics of any recirculated exhaust gas; and turbulence generation. At low engine speeds, an insufficient movement of the charge leads to an inadequate state of mixture preparation because of relatively low velocity between the inlet air flow and the flow from the injector. This typically produces increased emissions of carbon monoxide, hydrocarbons and soot.

The reference, JP-A 62-48927, discloses a spark-ignition internal combustion engine which has two inlet valves for each cylinder and with separate inlet passages leading to each valve. The first passage is orientated with respect to the combustion chamber to lead thereto in an essentially straight path and the second passage is oriented with respect to the combustion chamber to produce an air swirl pattern. A regulating valve associated with the first passage can be closed during a part-load range or engine mode to produce a swirl pattern of the intake air. By this method of intensifying and directing the air flow, the engine can be operated in a lean fuel/air mixture mode. Furthermore, in this mode the emissions of carbon monoxide, hydrocarbons and soot are markedly reduced. Furthermore any increase in nitrogen oxide emissions as a result of the intensified combustion can be compensated by increasing the degree of exhaust-gas recirculation. In a higher part-load or speed range using an essentially homogeneous charging process with a lean fuel/air mixture or an air ratio equal to one and using substantial exhaust-gas recirculation, the objective is to gain a relatively high charge movement so that a dilution tolerance with an air ratio $\lambda > 1.5$ can be obtained.

SUMMARY OF THE INVENTION

The primary object of the invention is to achieve a desirable charge movement over a wide speed range and/or load range of the engine along with a low-throttle loss part-load range.

According to the invention, a charger mechanism includes a connecting duct or passage between the first and the second passages. A regulating device is arranged in the connecting duct to apportion the air charge through the two inlet passages according to operating parameters. In this embodiment, the controlled air charge is utilised not only to raise the power output of the engine, but also to intensify and control charge movement. As a result, the engine operating range utilising the advantageous stratified charge mode is enlarged, especially into the upper part-load operating range or mode. Accordingly, it covers wider ranges of the useful driving conditions.

The intensification of the charge movement tends to inhibit undesirable knocking behaviour of the engine. Furthermore, due to the higher mass throughput under part load and consequently lower throttling, the dynamic response behaviour of the engine is appreciably improved, particularly as compared to an engine utilising intake manifold injection rather than direct injection. In a direct injected engine, the increased mass throughput can be utilised with little or no throttling and is not characterised by a time delay as with indirect injection. Moreover, because of a desired excess of air, there is the possibility of providing a second injection of fuel during the expansion phase of the cycle in order to increase exhaust gas energy to be utilised to drive a turbocharger or to rapidly heat-up a catalytic converter. Finally, in the stratified charge mode under a falling load, the higher mass throughput produces a temperature decrease which has an advantageous effect on the temperature profile for a DENOX type catalytic converter. This desirable effect may be further assisted by utilising a charge-air cooler or innercooler in the charge-air intake line.

Desirably, a centrifugal compressor or a volumetric compressor may serve as an air charger or supercharger. The charger may be driven by an exhaust gas turbine or be mechanically connected to the engine or be independently powered by an electric motor. An exhaust gas shock-wave type compressor could also be used. The air charger is directly connected to the first inlet passage by a charge air line which can include the charge air innercooler. No throttle valve is provided in the charge air line. The previously mentioned regulating device arranged in the connecting passage between the first and second inlet passages serves to influence the charge movement not for conventional quantity or flow regulation. The load related operation of the engine is controlled by means of the fuel injected per work cycle.

According to one refinement of the invention, the second inlet passage is connected to atmosphere via an intake line. In the intake line, a one-way or non-return valve is placed upstream of the connecting passage and a throttle valve is positioned further upstream from the one-way valve. The non-return valve prevents a flow of charge air to being expelled away from the engine. In a homogeneous charge mode, the connecting passage is selectively closed by the regulating device and the engine can take-in air through the second inlet passage, the non-return valve, and the throttle valve with the flow quantity controlled by the throttle valve. Meanwhile, the first inlet passage is supplied air by the charger.

If the feed volume and/or the feed pressure delivered by the charger can be regulated, the throttle valve and the intake line may be dispensed with. The flow quantity control during some portions of the characteristic engine operation can be through the charger. In an exhaust-gas turbocharger, the feed volume or feed pressure can be regulated by utilising a variable adjustable blade mechanism.

In the case of a charger or supercharger driven mechanically by the engine, the charger's speed may be regulated via a continuously variable gear drive. If the charger is driven by an electric motor, it is relatively simple to regulate the speed of the electric motor according to desired output requirements.

BRIEF DESCRIPTION OF THE DRAWINGS

Further objects and advantages of the invention can be gathered from the following description of the drawings. The drawings illustrate exemplary embodiments of the invention. The description and the claims contain numerous features in combination.

DESCRIPTION OF PREFERRED EMBODIMENTS

Figure 1:
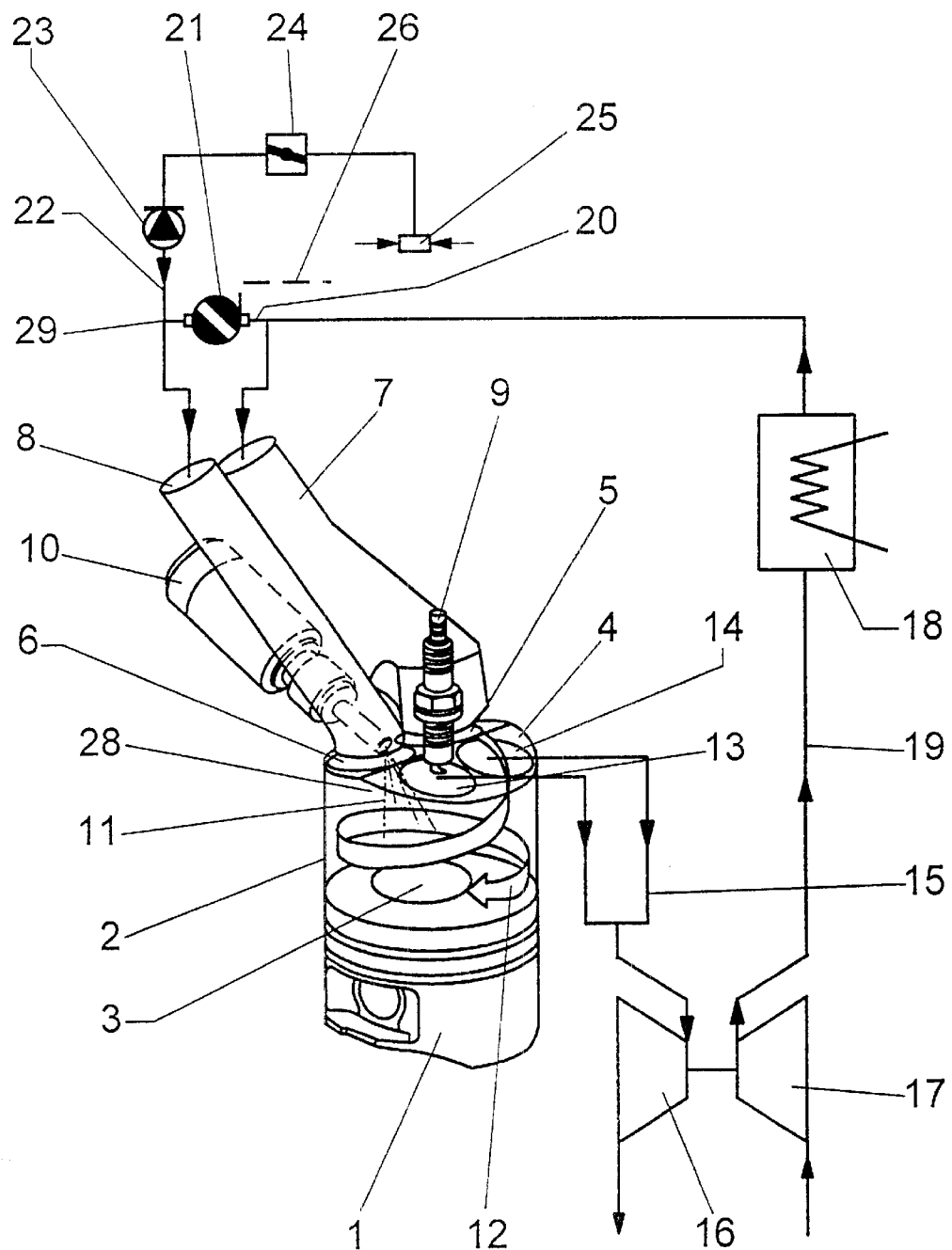
FIG. 1 shows a diagrammatic and somewhat schematical illustration of an engine according to the invention.

The typical internal combustion engine includes a reciprocally mounted piston 1 so that it can move or reciprocate up and down in a cylinder bore 2. The cylinder bore 2 is closed off at an upper end by a cylinder head 4. The cylinder head 4 supports a pair of inlet valves 5 and 6 and provides separate inlet passages 7 and 8 leading to the valves 5, 6. A combustion chamber 28 may include a recess space 3 in the crown of piston 1. The recess space 3 and combustion chamber 28 has a variable volume as the reciprocating piston 1 moves up and down in the cylinder bore 2. The said recess is connected, essentially unthrottled, to the rest of the combustion space 28.

A fuel injection device 10 is carried by the cylinder head 4 for the purpose of injecting fuel through one or more fuel nozzles or spray jets 11 directly into the combustion chamber 28. In the chamber 28, the fuel is mixed with air and then is ignited by energising at least one spark plug 9. The arrowed symbol 12 represents air flow or movement in the combustion chamber 28.

The first passage or duct 7 of the pair of inlet passages or ducts 7, 8 is designed and oriented relative to the combustion chamber 28 to act as a swirl producer. Air passing through it into the combustion space 28 moves in a swirling pattern essentially maintained in the combustion chamber 28. The second inlet passage or duct 8 is designed and oriented relative to the combustion chamber 28 to introduce air straight thereto and essentially swirl-free.

The cylinder head 4 also supports a pair of exhaust or outlet valves 13 and 14 connected via an exhaust line (shown simply by arrowed lines) to an exhaust side of a turbine portion 16 of a turbocharger. The turbine portion 16 of the turbocharger extracts energy from exhaust to power or drive an air charger or compressor portion 17 of the turbocharger. Air pumped from the compressor 17 passes into a charge-air line 19 to a charge-air cooler 18 and then to the air inlet or intake duct 7.

The air intake duct or passage 7 is connected via a connecting duct 20 to the second inlet duct or passage 8. A device or valve 21 in the duct 20 controls or regulates air flow therethrough. Also, an air inlet or intake line 22 is connected to the second inlet duct 8. Line 22 has an one-way or a non-return valve 23 to prevent flow away from the engine's combustion chamber 28. The non-return valve 23 takes the form of a lamella valve and is located upstream of the connecting line's outlet 29 into line 22. An air filter 25 is located at the inlet or free end of line 22 upstream of the non-return valve 23. Air is drawn into line 22 to produce a flow to the engine whenever regulating device or valve 21 is in its closed operational mode or position. The regulating valve 21 is activated in response to a signal through a signal line 26. Signal lien 26 extends from an electronic control unit (not illustrated). A throttle valve 24 is positioned between air filter 25 and the non-return valve 23 for regulating the flow quantity through line 22 when the connecting line 20 is closed by valve 21.

Figure 2:
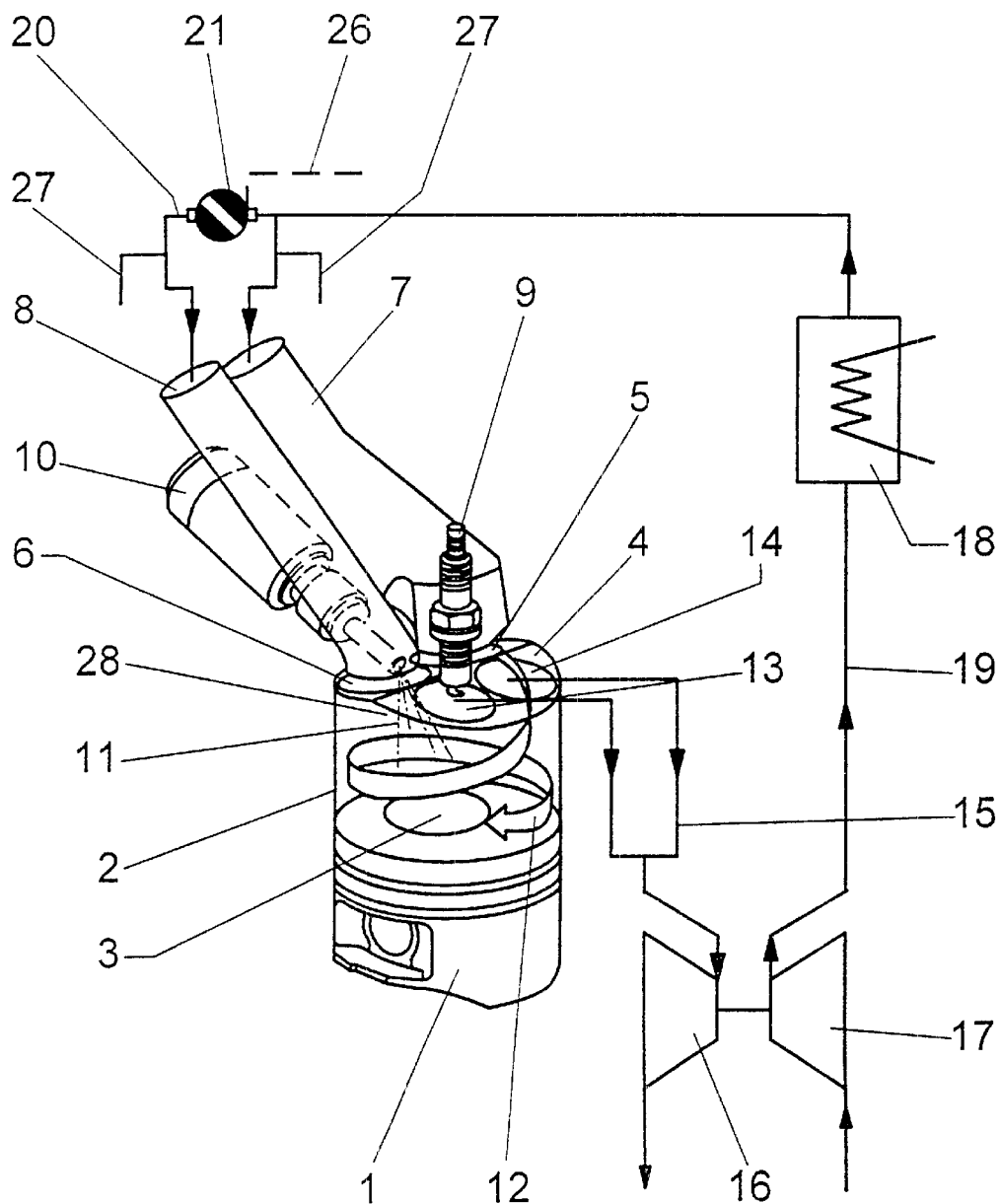
FIG. 2 shows a diagrammatic and somewhat schematical illustration of a second variant of the embodiment shown in FIG. 1.

A second embodiment is shown in FIG. 2 which dispenses with the intake line 22, the non-return valve 23, and throttle valve 24. Regulation of air flow without the throttle 24 is achieved by using a variable output charge-air line provided by a selectively variable output turbine portion 17 of the turbocharger by mans of variable blade geometry as adjusted in accord with function operating parameters.

In place of the turbocharger, a volumetric type charger may also be used. Specifically, a centrifugal compressor can be substituted. Furthermore, the compressor portion or charger 17 may be driven by the engine via a gear (not illustrated). The gear is expediently continuously variable, so the rotational speed of the charger 17 and consequently the air outlet volume can be regulated independently of the engine as a function of the operating parameters. Instead of being driven by the exhaust-gas turbine 16, the charger 17 may be driven by a variable-speed electric motor.

Furthermore, the composition of the charge and the charge stratification of the engine can be influenced by varying degrees of exhaust gas recirculation. This purpose is carried out by exhaust gas recirculation line 27 which leads to the inlet ducts 7 and 8.

Figure 3:
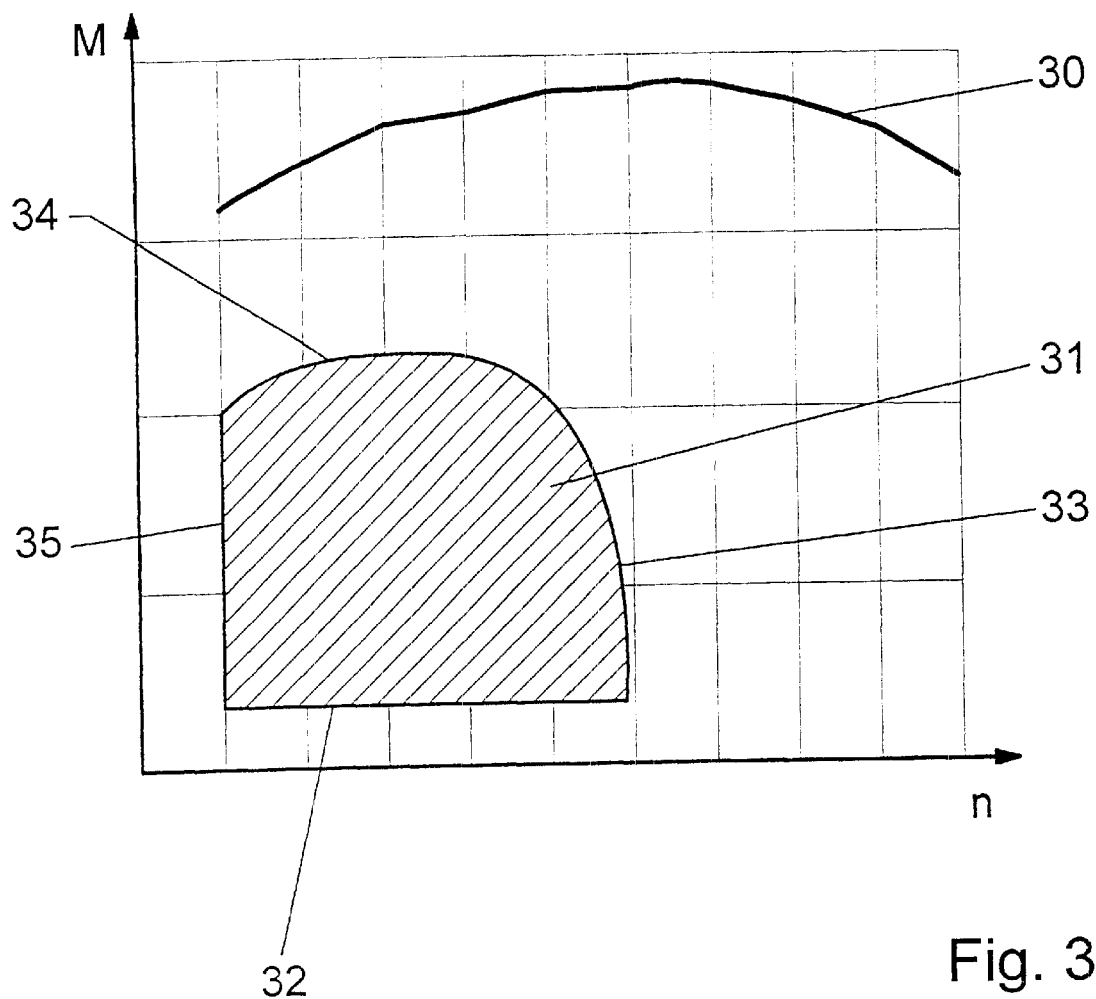
FIG. 3 shows a characteristic operational map or chart for a conventional operating range for the engine.

In FIG. 3, a graph is shown according to engine torque (M) plotted against rotational speed (n). The characteristic curve 30 identifies maximum torque. A hatched region 31 indicates the range of attainable low-throttle stratified operation. The lower boundary 32 is essentially determined by the energy of the exhaust gas. The left-hand boundary 35 is determined by the drain related to the power needed to drive various engine accessories and the desired degree of driving comfort. The right-hand and upper boundaries 33, 34 are determined by a combination of desired conditions such as driveability and emissions, in particular soot formation.

An internal combustion engine can be designed according to the subject invention so that the charge movement and volume are increased so that the range in which the engine operates in a stratified charge mode is extended and the average fuel consumption of the engine can be reduced.

We claim:

1. A spark ignited internal combustion engine with at least one cylinder and combustion chamber and at least two inlet valves per cylinder, each with a distinct inlet passage for delivering air to the intake valve, a first inlet passage arranged to conduct air in a swirl pattern and the second inlet passage arranged to conduct air substantially straight without swirl into the combustion chamber, and a fuel injection device for injecting fuel directly into the combustion chamber, comprising: an air charger (17) for generating a charge of air for the engine; a charge-air line (19) to deliver the charge of air to the first inlet passage (7); a connecting duct (20) extending between the first inlet passage (7) and the second inlet passage (8); regulating device (21) for controlling air flow through said connecting duct (20) wherein selective opening and closing of said regulating device (21) apportions the flow of air into the two inlet passages (7, 8).

2. The internal combustion engine according to claim 1, and in which a charge-air innercooler (18) is positioned in the charge-air line (19) leading from the charger (17) to the first inlet passage (7).

3. The internal combustion engine according to claim 1, and in which the second inlet passage (8) is connected to atmosphere via an intake line (22), a non-return valve (23) positioned upstream of the connecting duct (20) and its outlet (29) and a throttle valve (24) located upstream of the non-return valve (23).

4. The internal combustion engine according to claim 1, in which the output of the charger (17) is selectively variable.

5. The internal combustion engine according to claim 4 in which charger (17) is a compressor portion of a turbocharger and turbine portion (16) of the turbocharger has a selectively variable blade geometry to create a variable output pumping device.

6. The internal combustion engine according to claim 5 in which the turbine portion (16) has a variable blade cascade for facilitating the selectively varying the output of the compressor portion of the turbocharger.

7. The internal combustion engine according to claim 4 in which charger (17) is mechanically driven by the internal combustion engine and the charger speed and output are selectively variable.

8. The internal combustion engine according to claim 1 in which an exhaust-gas recirculation line (27) is connected to at least one inlet passage (7, 8).

* * * * *